US012385289B2

(12) United States Patent
Chiti et al.

(10) Patent No.: US 12,385,289 B2
(45) Date of Patent: Aug. 12, 2025

(54) MULTI-UNIT ACCESS CONTROL AND INFORMATION MANAGEMENT SYSTEM

(71) Applicant: OPENTECH ALLIANCE, INC., Phoenix, AZ (US)

(72) Inventors: Robert A. Chiti, Phoenix, AZ (US); Jon Loftin, Phoenix, AZ (US); Frank Dunkin, Phoenix, AZ (US); Jer Schweickart, Phoenix, AZ (US); Doug Subler, Phoenix, AZ (US)

(73) Assignee: OPENTECH ALLIANCE, INC., Phoenix, AZ (US)

( * ) Notice: Subject to any disclaimer, the term of this patent is extended or adjusted under 35 U.S.C. 154(b) by 233 days.

(21) Appl. No.: 18/118,622

(22) Filed: Mar. 7, 2023

(65) Prior Publication Data

US 2023/0287711 A1 Sep. 14, 2023

Related U.S. Application Data

(60) Provisional application No. 63/317,773, filed on Mar. 8, 2022.

(51) Int. Cl.
*E05B 55/00* (2006.01)
*E05B 17/20* (2006.01)
(Continued)

(52) U.S. Cl.
CPC ...... *E05B 65/0021* (2013.01); *E05B 17/2034* (2013.01); *E05B 47/0607* (2013.01);
(Continued)

(58) Field of Classification Search
CPC .... E05B 17/20; E05B 17/2007; E05B 17/203; E05B 17/2034; E05B 17/2084; E05B 47/06; E05B 47/0607; E05B 47/0012; E05B 2047/0017; E05B 2047/002; E05B 2047/0022; E05B 2047/0036; E05B 55/00;
(Continued)

(56) References Cited

U.S. PATENT DOCUMENTS

| | | | | |
|---|---|---|---|---|
| 8,596,330 | B2 | 12/2013 | Slusarski et al. | |
| 9,679,429 | B2 * | 6/2017 | Duncan | G07C 9/00309 |

(Continued)

FOREIGN PATENT DOCUMENTS

| | | | | |
|---|---|---|---|---|
| CN | 102131996 B * | 5/2015 | | E05B 47/0665 |
| WO | WO-2016093873 A1 * | 6/2016 | | F16M 13/02 |

(Continued)

*Primary Examiner* — Suzanne L Barrett
(74) *Attorney, Agent, or Firm* — SNELL & WILMER L.L.P.

(57) ABSTRACT

A locking mechanism includes a hasp having a tongue disposed along a first side of the hasp, and a captive latch pin protruding from the hasp disposed away from the tongue. The locking mechanism includes an actuator assembly with a captive latch and an actuator configured to manipulate the captive latch. The captive latch may receive the captive latch pin of the hasp. A body locking mechanism can obstruct access to at least a portion of the hasp and the actuator assembly, wherein the hasp may slidably move when the captive latch pin is not retained by the captive latch, and wherein a retention of the captive latch pin by the captive latch arrests the slidable movement of the hasp.

12 Claims, 13 Drawing Sheets

(51) Int. Cl.

| | |
|---|---|
| ***E05B 47/06*** | (2006.01) |
| ***E05B 63/18*** | (2006.01) |
| ***E05B 65/00*** | (2006.01) |
| ***E05B 65/48*** | (2006.01) |
| ***G07C 9/00*** | (2020.01) |
| *E05B 47/00* | (2006.01) |

(52) U.S. Cl.
CPC .............. *E05B 55/00* (2013.01); *E05B 63/18* (2013.01); *E05B 65/48* (2013.01); *G07C 9/00182* (2013.01); *E05B 2047/002* (2013.01)

(58) Field of Classification Search
CPC .... E05B 55/005; E05B 63/18; E05B 65/0021; E05B 65/0028; E05B 65/02; E05B 65/025; E05B 65/48; G07C 9/00182
See application file for complete search history.

(56) References Cited

U.S. PATENT DOCUMENTS

| | | | | |
|---|---|---|---|---|
| 10,544,624 | B2 | 1/2020 | Baker et al. | |
| 11,170,597 | B2 | 11/2021 | Roper et al. | |
| 11,505,967 | B2 | 11/2022 | Mantena et al. | |
| 11,512,498 | B2 | 11/2022 | Haagendrup | |
| 11,846,120 | B2 | 12/2023 | Hill et al. | |
| 11,920,378 | B2 | 3/2024 | Barnett et al. | |
| 2014/0150502 | A1* | 6/2014 | Duncan | E05B 47/0004 70/20 |
| 2019/0333304 | A1* | 10/2019 | Flynn | G06Q 20/327 |
| 2023/0304319 | A1 | 9/2023 | Kuenzi et al. | |
| 2024/0127655 | A1* | 4/2024 | Wright | H04L 12/2803 |
| 2024/0183198 | A1 | 6/2024 | Kuenzi et al. | |
| 2024/0254807 | A1* | 8/2024 | Mantena | E05B 47/0001 |

FOREIGN PATENT DOCUMENTS

| | | | | |
|---|---|---|---|---|
| WO | WO-2020257547 A1 * | 12/2020 | | G06F 21/6218 |
| WO | WO-2024243166 A1 * | 11/2024 | | |

* cited by examiner

MULTI-UNIT ACCESS CONTROL AND INFORMATION MANAGEMENT SYSTEM

CROSS-REFERENCE TO RELATED APPLICATION

The present application claims priority to U.S. Provisional Patent Application No. 63/317,773, filed Mar. 8, 2022, the entire contents of which are incorporated by reference in their entirety.

BACKGROUND

Multi-unit facilities such as storage unit facilities must secure access to a variety of locations. Some facilities restrict access using doors having a mechanism which can be interfaced with one or more locks. To provide access authorization, various users may be provided with one or more keys to access various units, buildings, etc. Both users and their authorizations may change relatively frequently. Such changes in access authorization may require manual processes, such as the addition or cutting of locks, providing multiple keys to a user, rekeying locks, etc.

SUMMARY

One embodiment of the disclosure is a locking mechanism. The locking mechanism includes a hasp having a tongue disposed along a first side of the hasp, and a captive latch pin protruding from the hasp disposed away from the tongue. The locking mechanism includes an actuator assembly having a captive latch and an actuator configured to manipulate the captive latch, wherein the captive latch is configured to receive the captive latch pin of the hasp. The locking mechanism includes a lock body obstructing access to at least a portion of the hasp and the actuator assembly. The hasp may slidably move when the captive latch pin is not retained by the captive latch, and wherein a retention of the captive latch pin by the captive latch can arrest the slidable movement of the hasp.

Another embodiment of the disclosure is a system. The system includes a hasp having a tongue disposed along a first side of the hasp, and a captive latch pin protruding from the hasp disposed away from the tongue. The system includes an actuator assembly comprising a captive latch and an actuator configured to manipulate the captive latch. The captive latch can receive the captive latch pin of the hasp. The system includes a lock body obstructing access to at least a portion of the hasp and the actuator assembly. The hasp may slidably move when the captive latch pin is not retained by the captive latch, and wherein a retention of the captive latch pin by the captive latch can arrest the slidable movement of the hasp. The system includes a processor communicatively coupled to the actuator, wherein the processor is configured to cause an engagement of the actuator upon a receipt of a lock assembly command.

Yet another embodiment of the disclosure is a non-transitory machine-readable medium having instructions stored thereon. The instructions includes instructions to cause a processor to receive a lock assembly command comprising an authorization credential. The instructions include instructions to validate the authorization credential against a locally stored copy of the authorization credential. The instructions include instructions to engage an actuator to release a captive latch pin from a captive latch coupled to the actuator. The instructions include instructions to detect a hasp location indicative of a lock state of a lock assembly. The instructions includes instruction to transmit the lock state of the lock assembly to a server.

DETAILED DESCRIPTION

Figure 1A:
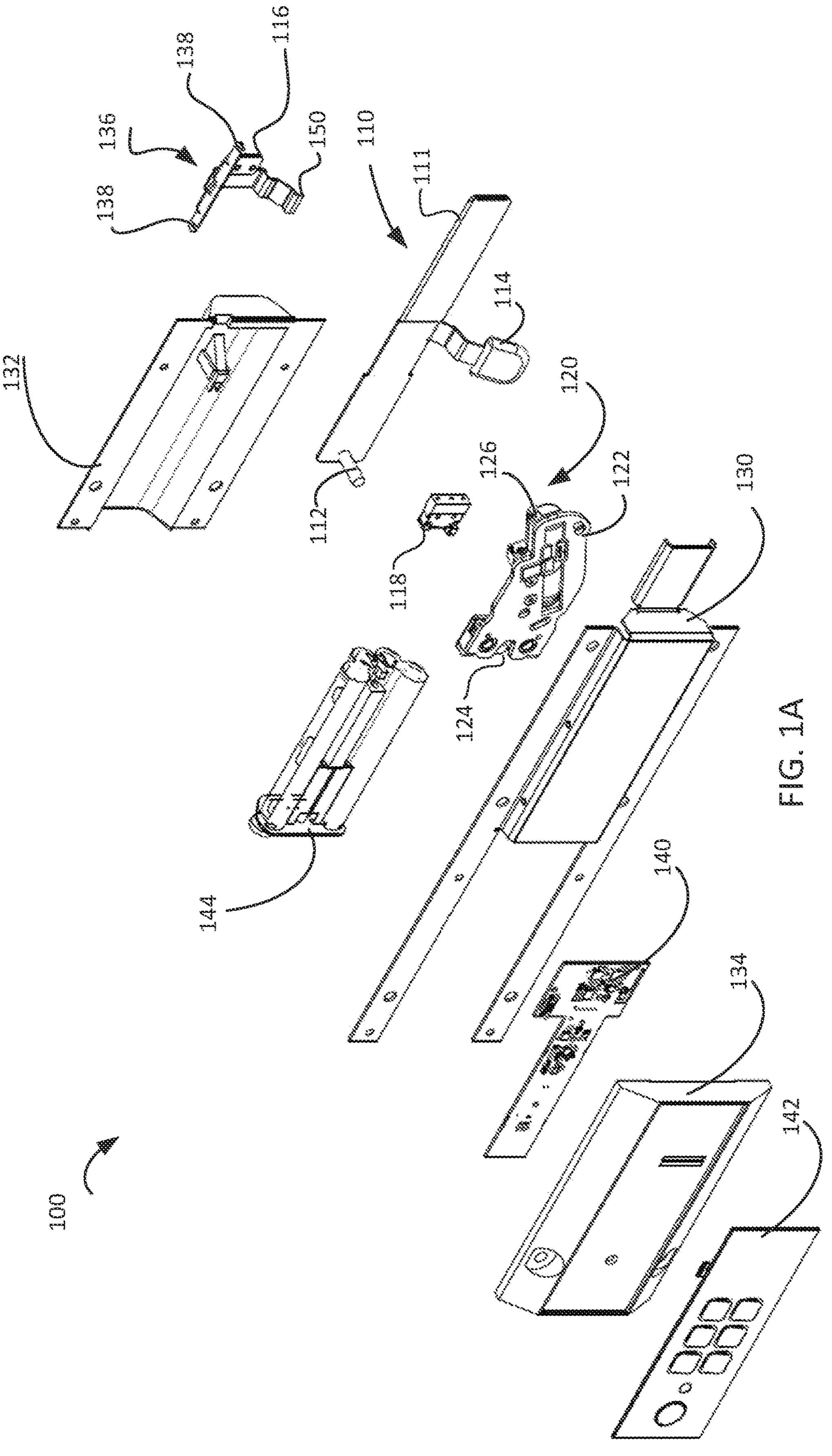
FIG. 1A is an exploded view of an electronically controlled lock assembly, according to some embodiments of the present disclosure.

An electronically controllable lock system may, advantageously, ease the assignments of user access to various units and areas of a multi-unit facility. Such benefits may be desirable in a large installed base of existing facilities as well as new build facilities. Some embodiments of the present disclosure are suited to interlock with mechanisms suited for manual locks, and may be retrofitted to an existing facility, or used at a new facility making use of traditional mechanisms, which may themselves secure a door. Some embodiments of the present disclosure may be intended for new installs, such as those with an integrated hasp tongue configured to mate with a mortise which may be disposed along a doorframe or otherwise secure a door to an immobile structure to prevent the door from opening.

The lock mechanism may include a slidable hasp, which is configured to be received by an immobile structure on a tongue end of the hasp. The immobile structure may be a door frame, a wall, etc. In some embodiments, the immobile structure may be selectively immobile. For example, one end of the hasp may be received by a hasp receiver disposed along a second door, as in the case of double doors.

A captive latch pin may be disposed along an end of the hasp, disposed opposite the tongue end. Advantageously, such a placement may avoid interference with other lock components when the hasp is slid away from the mortise (e.g., when unlocking). In some embodiments, the captive latch pin may be disposed away from the tongue end of the hasp. (e.g., along an opposite end, towards a middle of the hasp, etc.) Advantageously, such a hasp may be less susceptible to prying attacks, due to the shorter distance subject to prying force. In some embodiments, the hasp may be reinforced by an additional hasp support, which may protect the hasp against various attacks, as well as avoid undesirable displacement of various lock mechanism components during normal operation. For example, the hasp support can provide mechanical support along a hasp including a tongue end configured to telescopically couple with an opposite captive latch pin end, such that the hasp maintains a mechanical strength when operated. Such a telescoping hasp may reduce a lateral dimension of the lock mechanism relative to rigid hasps, while maintaining a lateral displacement of the terminal end of the hasp into a mortise. The captive latch pin may be joined to the hasp by riveting, threading, welding, etc., or the hasp may be originally manufactured (e.g., milled, cast, etc.) to include the captive latch pin and/or other features.

The lock mechanism may include a captive latch configured to receive the captive latch pin. The captive latch may be controlled by an active mechanism, such as a rotary actuator to lock the lock mechanism For example, the rotation of the rotary actuator may rotate the captive latch to a closed positions, wherein the closed position interferes with the captive latch pin to arrest the otherwise slidably movable hasp. In some embodiments, the captive latch includes a spring element which closes the captive latch, and thus locks the hasp in place without involvement of the rotary actuator. The rotation of the rotary actuator may thereafter open the lock by countering the spring force. Advantageously, such a mechanism may enable locking the mechanism in the event of a power loss or the failure of another component.

In some embodiments, the spring element or another locking mechanism may be used in combination with a detent or other latching mechanism, such that the captive latch remains open until the captive latch pin actuates the mechanism (e.g., releasing the detent), closing the latch. In some such embodiments, the opening of the latch may expel the captive latch pin from the captive latch. In some embodiments, the captive latch may alternate between open and closed positions by the rotary actuator, such that the hasp may be slid into a locked position, but the captive latch may not capture the captive latch pin until a lock command is given. Advantageously, such a mechanism may minimize accidental lockouts.

The locked or unlocked state of a lock mechanism may be detected by various sensors. For example, a captive latch which is normally open and closed only upon the presence of the captive latch pin may be sensed by the position of the rotary actuator. Additionally or alternatively, the position of the hasp may be sensed, which may, advantageously, enable a detection of the locking state in embodiments in which the captive latch is not normally open. Detecting a hasp position may also enable the proper detection of a lock state when the captive latch has been interfered with, such as by the insertion of a screwdriver or stick to close the latch mechanism.

The rotary actuator may be controlled manually, such as by the use of a key or knob, and/or may be electronically controlled. In embodiments which are electronically controlled, the rotary actuator may be communicatively coupled to an input device which may be co-located with the lock (e.g., an attached user keypad), or may be remote from the lock (e.g., a mobile device, a web server, a remote control panel, etc.). Some embodiments comprising remote control may include a radio to communicate with the remote control device. Additionally, or alternatively, a radio may be used to provide status information, alerts, etc. The radio may communicate over one or more protocols. The radio may communicate directly with a server or base station, or communicate over a network (e.g., a mesh network).

The lock also comprises one or more non-transitive memory devices storing various data. One datum may be a unique identifier. The unique identifier may be a serial number or another unique identifier (e.g., a MAC address), and may be assigned statically or dynamically. A memory device may store an access code locally, which, advantageously, may minimize a network attack surface, and may allow operation of the lock in the event of a loss of network communication. Further, such storage may allow access by a non-network device (e.g., a mobile device over Bluetooth, NFC, etc.

The electronic lock assembly also includes a power source, such as a battery, solar panel, or wire, and a power regulation circuit which may include various health sensors (e.g., battery voltage, temperature, instantaneous or average current, etc.). These sensors may enable detecting a battery state of charge (SoC) by referencing the voltage to a function or lookup table to determine a charged amount or percent. In some embodiments the function or lookup table may be normalized to a temperature, instantaneous current, etc. The battery state may be reported (e.g., by a light-emitting diode (LED) indicator indicative of power, low battery, over a radio, etc.).

A loss of battery power may indicate a changing of batteries as a normal maintenance procedure, a failure of battery power (e.g., due to an insufficient State of Charge (SoC), environmental interference, battery failure, etc.), or device intrusion (e.g., battery removal, a break in contact between the battery and a printed circuit board (PCB), PCB tampering, etc.). In any case, such a loss of battery power may be indicated by an LED or other human machine interface, by logging, by radio transmission, etc. For example, the loss of power may be transmitted upon a later power up, or in response to reaching a minimum voltage. In some embodiments, additional intrusion or environmental detection may be present. For example, various tamper, chassis intrusion, liquid contact, accelerometer sensors, etc. may be used to detect a device state, which may result in an indication of the device state. For example, an accelerometer may detect movement (e.g., as a tilt sensor), which may indicate a door (e.g., a hinged door, a roller door, a sliding door, etc.) is being opened. Alternatively or in addition, a watchdog or other periodic message may be transmitted, and the lack of receipt of such a message by another portion of the system may be used to generate an indication of the state, such as in response to a failure to reply to a message within an allotted time.

Referring to FIG. 1A, an electronically controlled lock assembly 100 is disclosed. The lock assembly 100 comprises a hasp 110 having a captive latch pin 112 disposed along a first end of the hasp 110, opposite a tongue 111 configured to mate with a mortise (e.g., a strike plate hole). The depicted hasp 110 further comprises a hasp slider 114, which may be configured to protrude through a front surface of the lock assembly 100, so that a user may grasp the hasp slider to slide the hasp in a lengthwise direction (e.g., to lock and unlock a door). The hasp slider 114 may further be configured to pass along tracks, bearings, or other guides while being manipulated. A further protrusion (not depicted) may also be configured to steady the hasp along a guide, activate a sensor switch, detect against lock intrusion, etc.

A hasp support bracket 136 can support the hasp 110 by transferring stress between the hasp and the lock body. For example, the hasp support bracket 136 can couple to the lock body directly, or via an actuator bracket 122 to support hasp support bracket 136 while allowing the hasp support bracket 136 to pass through an opening define between the hasp support bracket 136 and the actuator assembly 120. The hasp support bracket 136 can interface with the lock body top 130 via a cutout portion 138 to prevent displacement of the hasp support bracket 136 at least along a same direction as the slidable direction of the hasp 110. Another terminal portion 150 of the hasp support bracket 136 can include a protrusion to mate with another surface of the lock body top 130. The depicted hasp support bracket 136 is generally C-shaped wherein the cutout portions 138 and other terminal portion 150 of the hasp support bracket 136 are disposed along the front surface of the lock assembly (e.g., towards the case top 134). The C-shape of the hasp support bracket 136 can cause the hasp support bracket 136 to generate a spring force responsive to compression which may retain the other terminal portion 150 within a receiving portion of the lock body top 130. The opening of the C-shape between the terminal portion 150 and the cutout portions 138 can receive the hasp 110, actuator assembly 120, hasp location switch 118, or other lock assembly 100 elements, such that the hasp support bracket 136 can maintain the assembly of the lock. The hasp support bracket 136 can be removed to service or replace internal mechanisms of the lock assembly 100. A rear surface of the hasp support bracket 136 may be covered by the case bottom 132, or abut a door, which may ease servicing of the internal components of the lock assembly when removed from the door. The hasp support bracket 136 may include an interface portion 116 interface with movable portions of the lock assembly 100. For example, the interface portion 116 can include a latch release to interface with a latch of the hasp 110 (described further with regard to FIG. 1B), or a magnet, detent, or other portion to interface with a hasp location switch 118.

The hasp location switch 118 may be configured to detect a position of the hasp 110. The hasp location switch 118 may comprise a mechanical detent which detects an interference with the hasp 110, a magnetic sensor configured to detect the location of the hasp 110 or a portion thereof, an optical sensor, etc. One skilled in the art will understand that the location of the hasp 110 may be detected in a variety of ways. In some embodiments, the hasp location switch 118 may infer the location of the hasp 110 based on a sensed position or state of another lock component. For example, a state of actuator assembly 120, or a position of a component of actuator assembly 120 may be used to infer the location of the hasp 110. In some embodiments, the hasp location sensor switch 118 may infer the state of the lock assembly 100, either alone or in combination with additional sensors, states, or data.

An actuator assembly 120 comprises an actuator bracket 122 which may be configured (e.g., with threads, holes, latches, etc.) to mate with other lock mechanism components. A captive latch 124 is joined to the actuator bracket, and is configured to receive the captive latch pin 112. An actuator 126 is configured to open or close the captive latch 124.

A lock body top 130 secures the actuator assembly 120 and the hasp 110 to a door. The lock body may also provide protection against ingress attacks on lock assembly components, environmental conditions, etc. For example, the lock body top 130 may comprise metal for protection against ingress attempts, water resistant gaskets, an ultraviolet-B resistant polymer for protection against solar radiation, or the like. The lock body top 130 may comprise and/or mate with a case bottom 132 (e.g., a back plate). The case bottom 132 may be configured to conform to the surface of a door. For example, a case bottom 132 may be flat to interface with a flat door, or may be shaped to interface with a patterned door (e.g., may be hull shaped to interface with contoured metal corrugated door at a storage facility). The hasp support bracket 136 may also be configured to mate with a case top 134 (e.g., a front plate).

The case top 134 may provide further environmental and physical ingress protection, as well as a surface configured to display branding, instructions to a user, etc. The front plate may comprise passages (e.g., passages configured to allow buttons, light, or cables) to pass through the case top 134.

A keypad 142 (e.g., a touchpad) comprises keys to enter a unit code, as well as other human machine interfaces, For example, an LED display may indicate a status of the lock assembly 100. For example, a multicolor LED may indicate various statuses with various colors, flashing patterns, etc. (e.g., a quickly flashing green light may indicate a programming mode; a solid red light may indicate a lack of communication; a slowly flashing amber light may indicate a low battery; and a slowly flashing red light may indicate an account status preventing customer access). The keys may include numeric, alphanumeric, and other characters. For example, the keypad may include a "#" or "*" key, which may precede a code entry, conclude a code entry, or be comprised within a code entry. The keypad 142 may include a power or wake key. In some embodiments, the power or wake key may place the lock assembly 100 into an on, off, or sleep state. For example, the lock assembly 100 may operate in a normal operating mode which may be a low power mode (e.g., may wake to send a status signal periodically). However, upon a wake signal, which may be entered from a dedicated key or based on any key entry, the lock assembly 100 may increase a rate of update, or enable additional functionality, such as keycard or near-field-communication (NFC) access, or a wireless connection (e.g., a Bluetooth connection). The keypad is communicatively coupled to a PCB 140 hosting a processor, the radio, the LED, and other components.

The various components of the PCB are powered by a battery assembly 144. The depicted battery assembly 144 is configured to be removed. For example, the battery assembly 144 may be removed in order to replace rechargeable or single use batteries (e.g., 18650, AA, AAA, etc.). In some embodiments, the battery assembly 144 or the PCB 140 may comprise battery management components, which may control the charging, and/or monitor the status of the battery assembly 144.

Figure 1B:
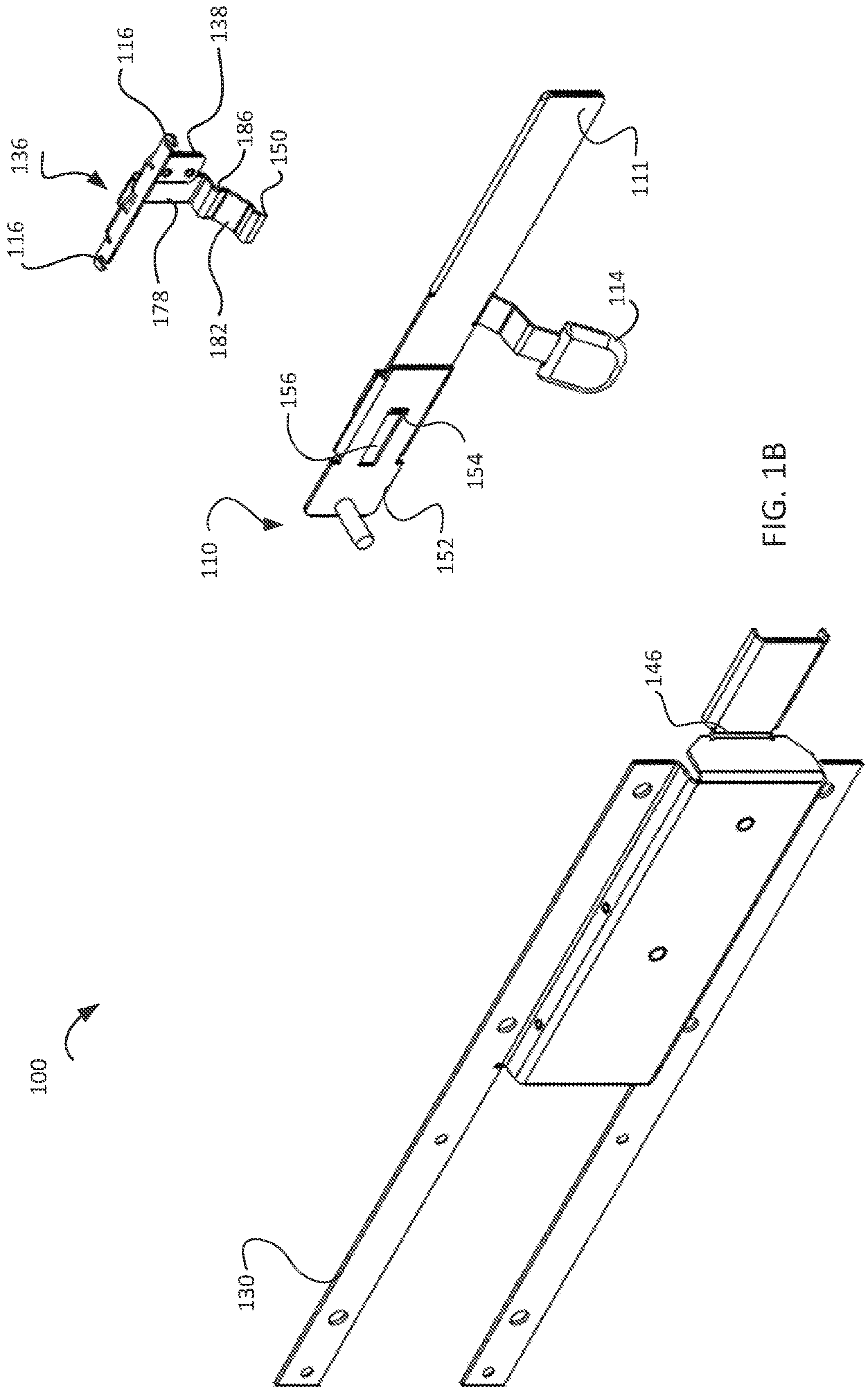
FIG. 1B is an exploded view of select components for the electronically controlled lock assembly, according to some embodiments of the present disclosure.

Referring now to FIG. 1B, an exploded view of select components for the electronically controlled lock assembly 100 is provided, according to some embodiments of the present disclosure. A hasp 110 includes a tongue 111 telescopically coupled an opposite captive latch pin end 152. For example, the captive latch pin end 152 can be configured to receive a portion of the tongue 111. A latch 154 can selectively non-slidably couple the captive latch pin end 152 to the tongue 111. For example, the latch 154 can cause the captive latch pin end 152 and the tongue 111 to slide as a solid member for a first portion of travel from the closed position. A force applied via the hasp slider 114 can cause the hasp 110 to interface with a latch release to disengage the latch. For example, the latch release can be positioned on the hasp support bracket 136, the actuator assembly 120, or the lock body. The captive latch pin end 152 can include an opening 156, track, or the like to receive the latch 154, or a guide portion of the tongue 111 which can resist torsion or otherwise strengthen the hasp 110. Thus, the tongue 111 of the hasp 110 can slidably move coupled with the captive latch pin end 152 at a first terminal portion of travel approaching or entering a mortise, to prevent retraction when the lock assembly 100 is locked (e.g., to prevent tampering). Further, the tongue 111 of the hasp 110 can telescopically engage with the captive latch pin end 152 at a second terminal portion of travel, opposite the first portion of travel. References to a telescopic hasp 110 may refer to any hasp 110 having at least a first portion and a second portion selectively slidably coupled such that a longitudinal dimension of the hasp 110 can vary.

In some embodiments, the lock body can abut a mortise (e.g., the position of the mortise or the lock body top 130 can be adjusted a distance corresponding to the telescoping distance of the hasp 110). For example, a hasp outlet 146 may be a non-protruding opening from the lock body. In some embodiments, the lock body top 130 can include a hasp outlet 146 comprising sheathing to protect the tongue 111 of the hasp 110 from cutting or prying attacks, or to maintain a stability thereof (e.g., along tracks, bearing, or the like).

A rearward portion 178 of the hasp support bracket 136 can receive the hasp 110 along a front face thereof. The hasp support bracket 136 extends frontward from the rearward portion 178, to first bend 184 (not depicted) above the rearward portion 178 and a second bend 186 depicted below the rearward portion 178. For example, the hasp support bracket 136 can extend frontward a distance which is at least a thickness of the hasp 110. A portion of the hasp support bracket 136 can extend frontward and downward from the bottom of the rearward portion 178, and frontward and upward from the top of the rearward portion 178 to form the C-shape. Put differently, the first bend 184 or the second bend 186 can be greater than 90 degrees relative to a rear surface of the hasp support bracket 136. For example, the first bend 184 or the second bend 186 can be about 135 degrees such that the hasp support bracket 136 extends along a lower extension portion 182 frontward and downward from the rearward portion 178 at about 45 degrees. Such a design can cause a cavity of the C-shape to increase towards the front of the lock assembly 100 (e.g., to interface with the lock body top 130 or to receive the actuator assembly 120). In various embodiments, the hasp support bracket 136 can include vertical portions to increase a dimension of the cavity of the C-shape, and which may decrease a lock thickness for a particular bend angle of the first bend 184 or the second bend 186. Likewise, a particular bend angle may be adjusted to adjust a cavity dimension, lock thickness, etc.

Figure 1C:
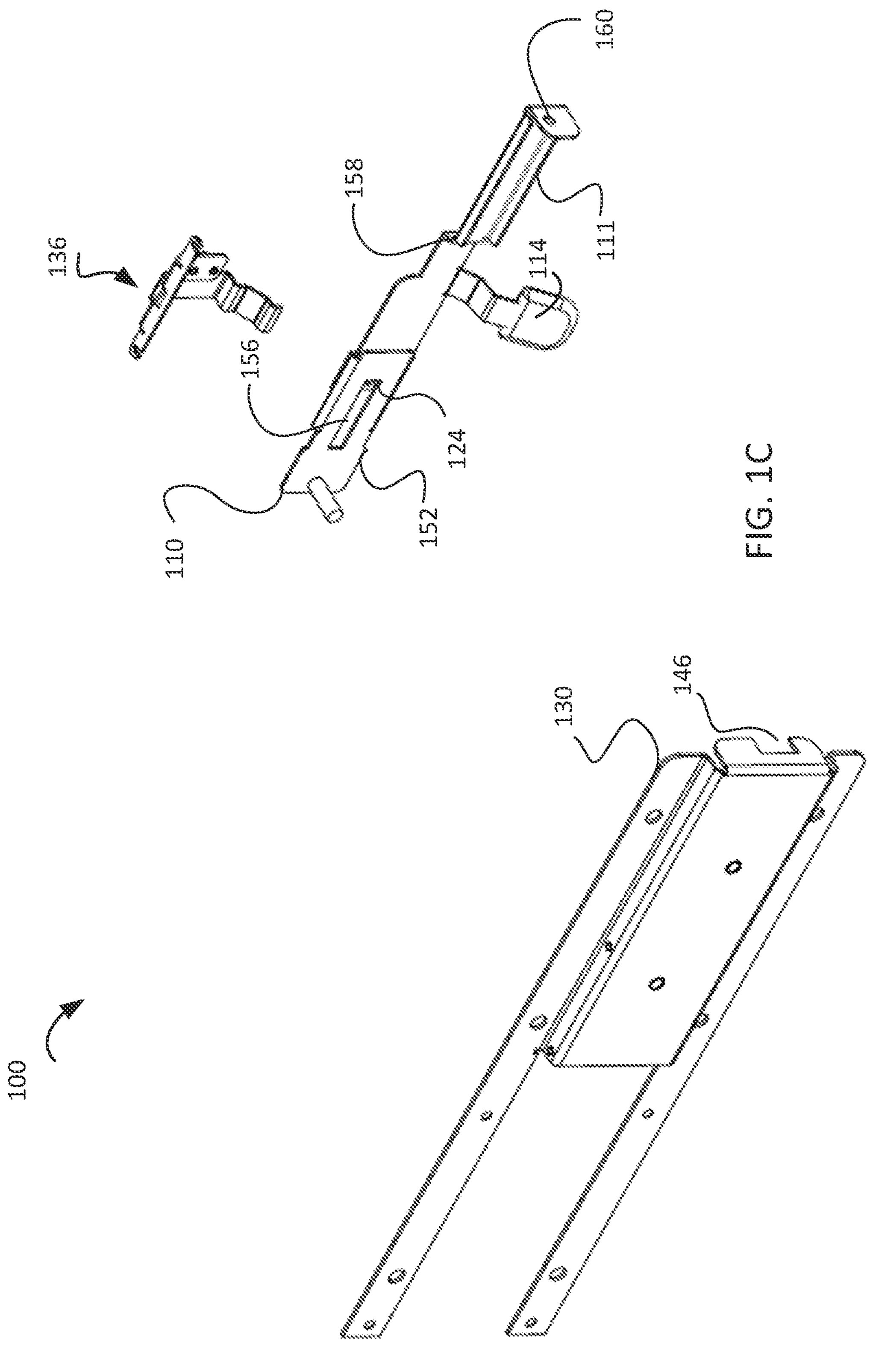
FIG. 1C is another exploded view of select components for the electronically controlled lock assembly, according to some embodiments of the present disclosure.
Figure 1D:
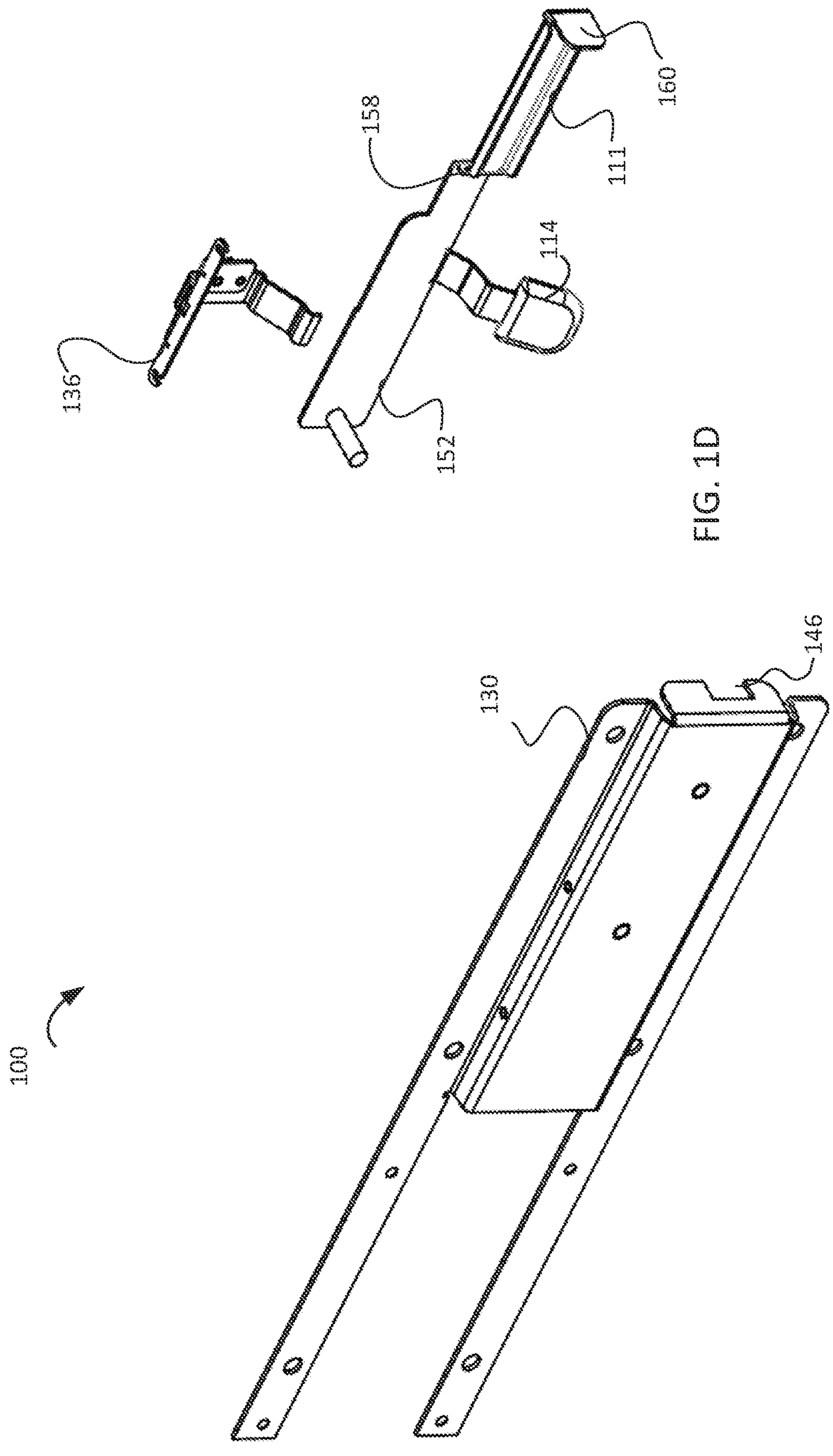
FIG. 1D is yet another exploded view of select components for the electronically controlled lock assembly, according to some embodiments of the present disclosure.

Referring now to FIG. 1C, another exploded view of select components for the electronically controlled lock assembly 100 is provided, according to some embodiments of the present disclosure. The hasp 110 includes the captive latch pin end 152 slidably coupled with the tongue 111. The tongue 111 includes a bend extension 158 to extend the hasp towards the front of the lock body top 130. The bend extension 158 can ease access of the tongue or permit the hasp to pass over molding, or other obstacles, or to interface with a mortise extending frontwards from a door. The terminal portion 160 of the tongue 111 can include a further bent portion to interface with a mortise, lock, or the like. For example, the further bent portion can prevent opening the lock in the presence of an overlock. The terminal portion 160 of the tongue 111 can include an opening to receive a locking pin, tamper seal, or otherwise secure the lock assembly 100. Like other elements of the present disclosure, the various features of the lock assembly 100 can be omitted, substituted, added, or modified. For example, referring now to FIG. 1D, the lock body top 130 of FIG. 1C (e.g., comprising a same hasp outlet 146) is depicted along with a non-telescoping hasp 110 including a bend extension 158, and a terminal portion 160 including bent portions but lacking an opening.

Figure 1E:
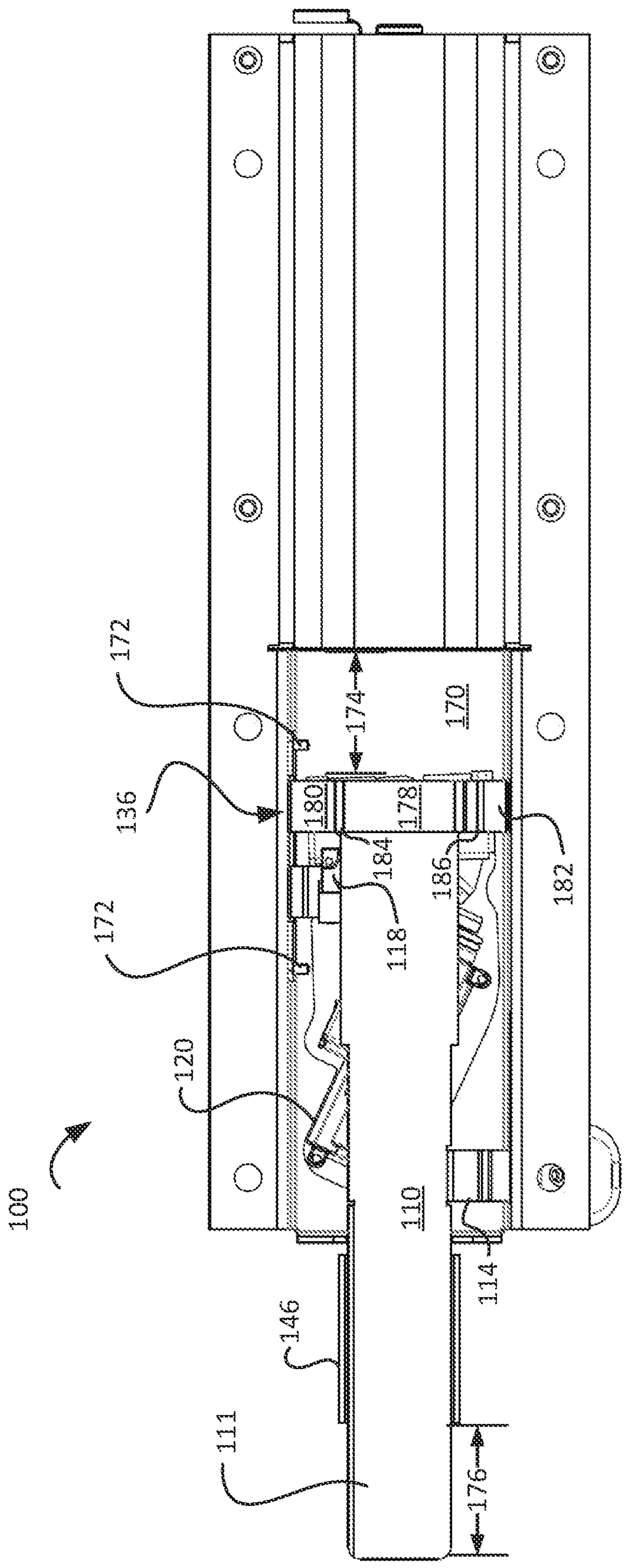
FIG. 1E is a rear assembled view of an electronically controlled lock assembly, according to some embodiment of the present disclosure.

Referring now to FIG. 1E, a rear assembled view of an electronically controlled lock assembly 100 is provided, according to some embodiments of the present disclosure. For example, the depicted lock assembly 100 may be an assembled view of the lock assembly 100 of FIG. 1A. The lock body top 130 includes protrusions 172 to interface with cutout potions 138 (e.g., recesses or eyelets) of the hasp support bracket 136, such that the hasp support bracket 136 can transfer force to the lock body top 130 there-through, which may resist a displacement of the hasp support bracket 136. Another terminal portion 150 of the hasp support bracket 136 can include a protrusion to interface with the lock body top 130, such that the other terminal portion 150 can be inserted into the lock body top 130, and the cutout potions 138 can be rotated to interface with the corresponding protrusions 172 to couple the hasp support bracket 136 to the lock body top 130 or retain any elements of the lock assembly 100 therebetween. The hasp support bracket 136 may be compressed to mate with the lock body top 130 which may maintain a coupling according to a spring force of the hasp support bracket. The hasp 110 is disposed between the hasp support bracket 136 and the lock body top 130. The hasp location switch 118 is disposed proximal to the hasp 110 to detect a presence or position thereof.

The hasp 110 is depicted in a closed position such that the tongue 111 extends beyond the hasp outlet 146. The tongue 111 can engage with a mortise, overlock, or the like to lock a door. The lock assembly 100 includes a receiving cavity 170 opposite the hasp outlet 146 to receive the end of the hasp 110 opposite the tongue 111 (e.g., the captive latch pin 112 portion of the hasp 110). In some embodiments, such as embodiments comprising a telescoping hasp 110, a latch 154 can interface with a latch release of the hasp support bracket 136 to telescope the hasp 110. For example, the longitudinal dimension 174 of the receiving cavity 170 may be less than the extension 176 of the hasp 110 beyond the hasp outlet 146, wherein the hasp slider 114 can slide the hasp during a first portion of travel from the depicted position to occupy the receiving cavity 170. A second portion of travel of the hasp slider 114 can cause the latch 154 coupling respective portions of the hasp 110 to interface with a latch release to telescopically retract the respective portions of the hasp. The hasp slider 114 can continue to retract the tongue 111 via the telescopic retraction, whereupon the tongue 111 portion is received by the captive latch pin end 152 of the hasp rather than continuing to extend into the receiving cavity 170. Thus, the extension 176 of the hasp 110 beyond the hasp outlet 146 may be of greater dimension than a corresponding longitudinal dimension 174 of the receiving cavity 170. Such as design may be employed to shorten a lock dimension, reducing material use or weight, and place locks in space-constrained spaces. Further, since the respective portions of the hasp are coupled for the first portion of travel, the hasp 110 can maintain the lock assembly in a locked position securing the door, regardless of whether the hasp is, for example, a telescoping hasp or a single piece hasp 110.

Referring in greater detail to the hasp support bracket 136, the rearward portion thereof receives the hasp 110. For example, the rearward portion may extend rearward from the first bend 184 and the second bend 186 a distance equal to or greater than the thickness of the hasp 110. The first bend 184 defines the upper extension portion 180 which extends upward and frontward (into the page, as depicted) to an upper portion of the hasp support bracket 136 including the cutout portions 138. A second bend 186 defines the lower extension portion 182 which extends downward and frontward (into the page, as depicted) to another terminal portion 150 of the hasp support bracket 136. The frontward extension of the upper extension portion 180 and lower extension portion 182 can form a cavity thickness corresponding, at least in part, to a lock thickness. A vertical compression of the hasp support bracket 136 can induce stress at the first bend 184 and the second bend 186 (e.g., the spring force) to retain the hasp support bracket 136 within the lock body top 130. The upward and downward extension of the upper extension portion 180 and lower extension portion 182, respectively, can define, at least in part, a vertical dimension of a cavity to receive the actuator assembly 120 between the lock body top 130 and the hasp support bracket 136.

Figure 2A:
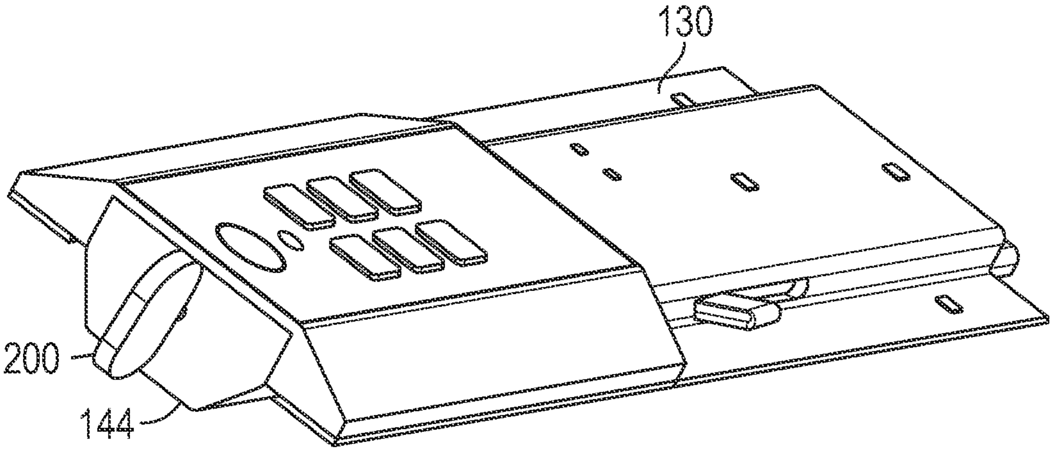
FIGS. 2A-2B are the electronically controlled lock assembly, shown having a battery assembly ejected, according to some embodiments of the present disclosure.
Figure 2B:
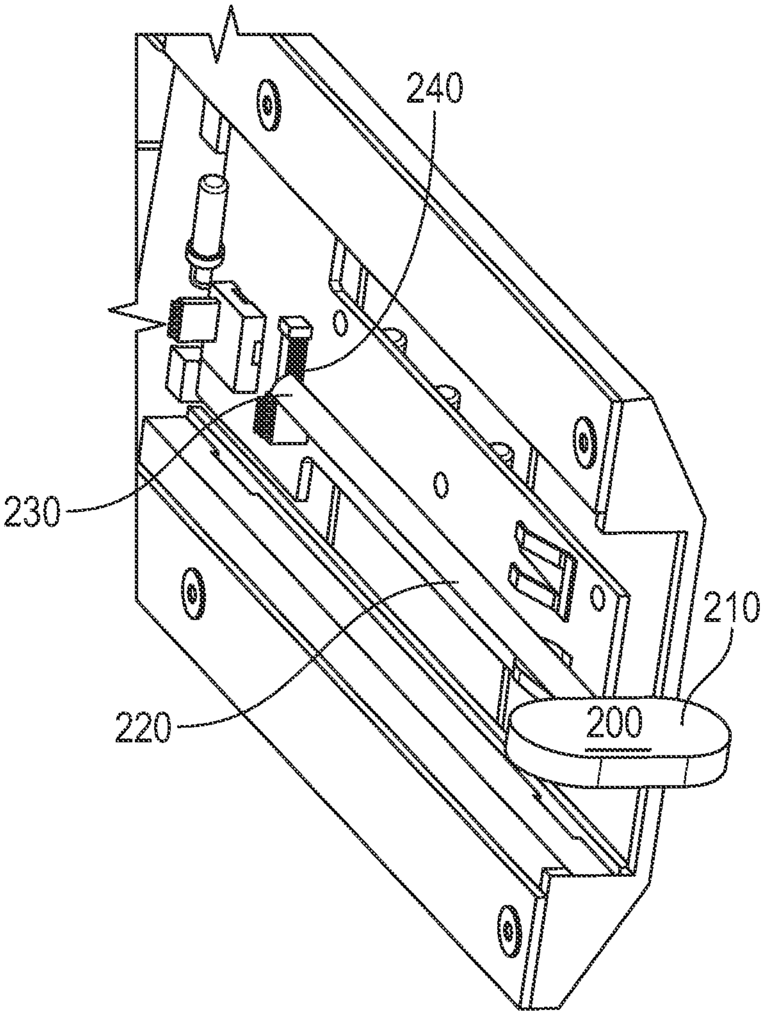

Referring now to FIG. 2A a lock assembly 100 is depicted having inserted therein a battery removal tool 200 (e.g., a key). As depicted in FIG. 2B, the battery removal tool 200 may be inserted into the lock whereupon a battery removal tool handle 210 may be rotated, such that a battery removal tool shank 220 transmits the rotation to a battery removal tool precision tip 230, which engages with a battery assembly retention mechanism 240 to allow the removal of the battery pack.

Figure 2C:
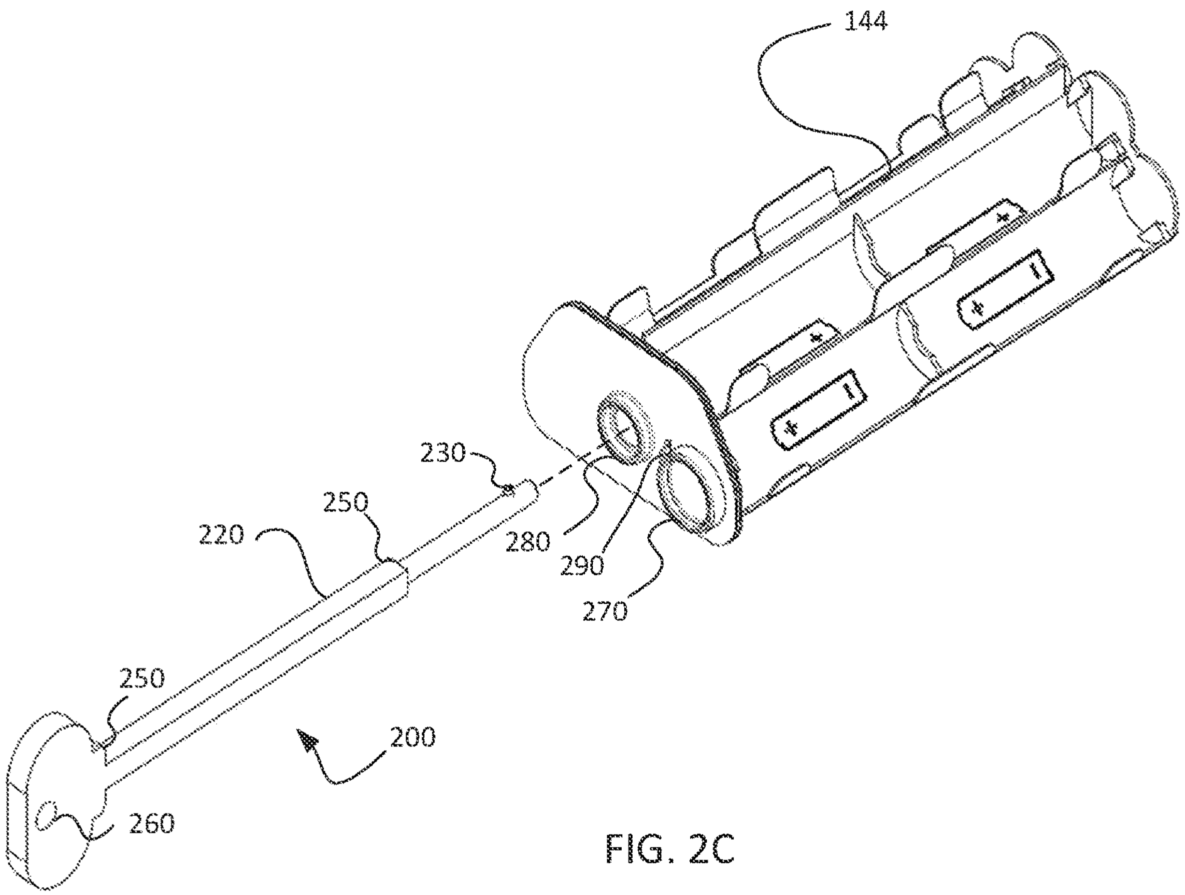
FIG. 2C is the battery removal tool handle interfacing with the battery assembly, according to some embodiments of the present disclosure.

Referring now to FIG. 2C, a view of the battery removal tool 200 is provided, according to some embodiments of the present disclosure. The battery removal tool shank 220 can include a cutaway portion including a precision tip 230 configured to engage with the battery assembly retention mechanism 240. A shoulder 250 can separate the cutaway portion from a thicker portion of the battery removal tool shank 220. Various instances of the battery removal tool 200 can include the precision tip 230 at different points along the longitudinal axis of the battery removal tool 200. The various battery removal tools 200 can mate with various lock assemblies 100 having variously disposed battery assembly retention mechanisms 240. A master battery removal tool 200 can include more than one precision tip 230 or an extended precision tip 230 to interface with various lock assemblies 100. One or more shoulders 250 of the battery removal tool 200 can provide positive depth control when the battery removal tool 200 is inserted into the battery pack to align the precision tip 230 with the battery assembly retention mechanism 240. The shoulders 250 may further ease an insertion of the battery removal tool 200 into the battery assembly 144, by “funneling” the precision tip towards the battery assembly retention mechanism 240. A handle of the battery removal tool 200 can include an aperture 260, or an identity corresponding to the location of the precision tip 230 or a mating lock assembly 100. The battery removal tool 200 can be made from various metals, polymers, or the like (e.g., zinc plated cold-roll steel).

A protective cover 270 can protect a battery removal channel 280 from an ingress of dust, fluids, and the like. For example, the protective cover 270 can be or include a flexible material to form a seal around the battery assembly. Other portions of the battery assembly 144 or lock assembly 100 can include further gaskets or seals (e.g., an O-ring gasket) to prevent environmental ingress between the battery assembly 144, the case bottom 132 and the lock body top. A retention member such as a living hinge 290 can join the protective cover 270 to the battery assembly 144. The living hinge 290 can be flexible, allowing the protective cover 270 to be moved to expose the battery removal channel without becoming separated from the battery assembly 144. The living hinge can avoid unintentional dropping or misplacement of the protective cover 270 when accessing battery assemblies 144.

As depicted, the battery assembly 144 can receive batteries. According to various embodiments, different numbers, types, or styles of batteries can be employed. For example, the battery assembly 144 can be configured to receive 8 batteries. The batteries may be arranged in one or more series strings (e.g., 1, 2, or 4 strings). For example, the battery assembly 144 can form 2 series strings, such that 4 batteries can be omitted and the battery can continue to operate as a same voltage. The battery assembly 144 can include various wings, or other retention portions to prevent retain the batteries during handling.

Figure 3:
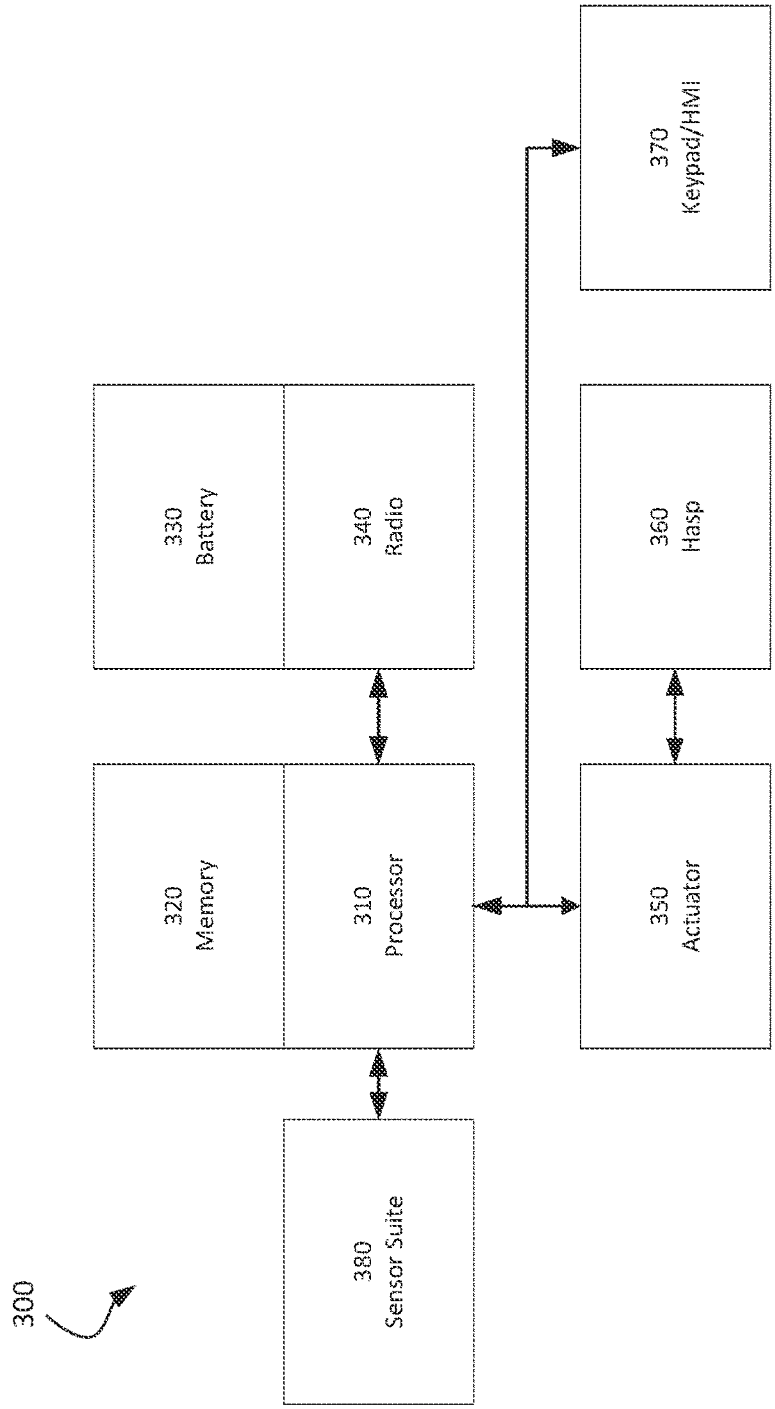
FIG. 3 is a block diagram of a lock assembly, according to some embodiments of the present disclosure.

FIG. 3 is a block diagram of a lock assembly 300, according to some embodiments of the present disclosure. The lock assembly 300 comprises a processor 310 which is communicatively coupled to a memory device 320. At least one memory device 320 is non-transitive (e.g., NAND or NOR FLASH, a hard drive, NVRAM, etc.). Additionally, the lock assembly 300 may comprise transitive local memory devices 320 such as DRAM, SRAM, etc. The processor 310 and memory device may be 320 integrated, or may be modular, and one skilled in the art will understand may comprise a broad spectrum of technologies, instructions, etc. The memory may contain instructions operable by the processor, logs of unit data such as successful entry attempts, unsuccessful entry attempts, battery SoC, tamper events, etc. One or more credentials authorized to operate the lock assembly 300 may also be stored by the memory. Each credential may have a plurality of access rights assigned to it. For example, a master credential may enable access to the unit at all times, an employee access credential may enable access at a subset of times, such as regular business hours. A user access code may enable access during some or all hours. Credentials may include or be associated with expiration dates that must be renewed, updated, etc. (e.g., by the processor 310 or a server communicatively coupled thereto). For example, a master code may expire after one year as a security measure, and a user code may expire at the end of a billing period, unless updated or renewed. Alternatively or in addition, access codes may be revoked. Some embodiments may also comprise a real time clock (RTC), which may be used to determine the validity of access codes with respect to time.

The lock assembly 300 comprises a power source which includes a battery 330 in the depicted embodiment. The battery 330 may comprise a one cell or a plurality of cells of any chemistry (e.g., alkaline, lithium-ion, etc.). For example, the battery may be the battery assembly of FIG. 2C.

A radio 340, in conjunction with the processor 310, may communicate with additional lock assemblies and other devices over various protocols (e.g., WiFi, Zigbee, Bluetooth, Bluetooth Low Energy (BLE), cellular, etc.). In some embodiments, a single network is selected. In some embodiments, a plurality of networks are selected (e.g., a primary and failover network may be selected, or a customer and management network may be selected.) Some or all access codes may be updated over the radio 340. For example, a new access code may be assigned over the radio 340, or a change of status of an existing access code may be assigned over the radio 340 (e.g., an overdue account may be updated to reflect a current account). In some embodiments, a signal received by the radio 340 may activate an actuator 350, such as to lock or unlock the lock assembly 300.

The actuator 350 may be a linear actuator or rotary actuator, and may be controlled by the processor. The actuator is configured to arrest the movement of a hasp 360. In some embodiments, a locked actuator may enable a hasp 360 to move freely. In some embodiments, additional arresting mechanisms may also arrest the movement of the hasp 360. For example, the actuator of the lock assembly 300 may arrest a first end of the hasp 360, and a manual overlock (e.g., a padlock disposed through a lock-eye associated with the hasp 360) may arrest a second end of the hasp 360. Thus, in order to operate (e.g., slide, rotate, disengage) the hasp 360, the manual overlock and the actuator 350 must both be in an unlocked state. The processor 310 may impose a logical overlock to disable keypad or other access (e.g., a customer may prevent employee access, or an employee may prevent customer access, such as in the event of non-payment). Advantageously, such an embodiment may provide additional security (e.g., may prevent employee access based on a master code). Alternatively, the lock assembly 100 may enable the hasp to move in the even that a mechanical lock is present, such as by allowing hasp movement in another direction. Advantageously, such an embodiment may obviate lock cutting to access a unit, such as for auction. Furthermore, such an assembly may be suited to retrofit existing applications wherein a preexisting lock hasp may be present, and wherein another suitable mortise does not exist and/or may not be reasonably fitted to receive a tongue of the hasp 360.

A keypad 370 is depicted communicatively coupled to the processor 310 which is, in turn, communicatively coupled to the actuator 350. The processor may receive key entries from the keypad 370 such as wake signals, keypad codes, etc. and the keypad 370 may receive signals from the processor, such as LED statuses. In response to the key entries, the processor 310 may perform various functions. For example, the processor 310 may engage or disengage the actuator 350, send or receive messages (e.g., to transmit successful or unsuccessful key code entries), engage a network (e.g., to receive an authentication code over the network), save new data to memory 320 such as an entry log or a key code change, or perform other actions herein described.

A sensor suite 380 is also communicatively coupled to the processor 310. The sensor suite 380 may comprise battery management sensors which may contain information related to a battery SoC, hasp 360 location or other sensors from which a state of the lock assembly 300 may be inferred, link states of various radios 340, various environmental sensors (e.g., data indicative of submersion or moisture ingress, an accelerometer, etc.), force sensors which may indicate a condition of the actuator 350, etc. A battery compartment sensor may provide an indication that a battery cover is opened or a battery pack is removed to the processor 310. For example, a switch, a voltage sensor, a light sensor, etc. may indicate a battery compartment opening. Further, the processor 310 can detect a motor state or position (e.g., an actuator), either directly from the unit, or based on another sensor (e.g., a hasp 360 position sensor, or an instantaneous current measurement from a power management unit may indicate the state or position of a motor).

Figure 4:
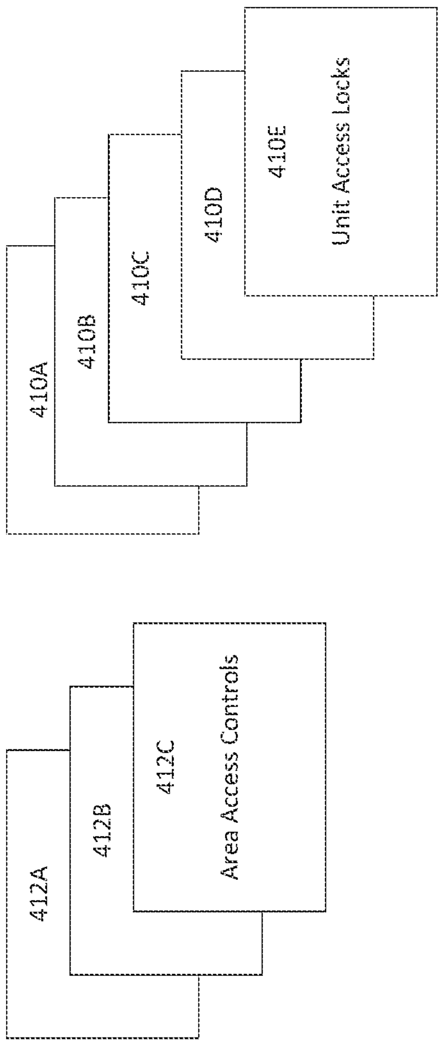
FIG. 4 is a system-level diagram of an authorization access control system, according to some embodiments of the present disclosure.

FIG. 4 is a system-level block diagram of an authorization access control system. A plurality of unit access locks 410 control access to a plurality of units. The units may be storage units, lockers, etc. In some embodiments, each unit access lock 410 may control access to one and only one unit. Alternatively, a plurality of unit access locks 410 may control access to a single unit, or one unit access lock 410 may control access to a plurality of units. For example, if a single unit is formed from the combination of two separately controlled units, each having a unit access lock 410, then the unit access locks 410 may be configured to allow access through either of the unit access locks 410. Advantageously, such an approach may permit a user to access a remote portion of their combined unit which may be otherwise inaccessible, or difficult to access. Alternatively, only one of the two unit access locks 410 may be accessible. Advantageously, such an approach may maximize the usable space of a unit, because the possible interference of/access to a door may be avoided.

A plurality of area access controls 412 are depicted, each of which controls access to an area. Area access controls 412 may contain similar elements as unit access locks 410. For example, an area access control 412 may be of the same construction as a unit access lock 410, but may be used to secure a common area. Area access controls 412 may also differ from unit access locks 410. Some area access controls 412 may contain a larger battery, and may be hardwired in addition to or instead of battery power, which may enable a higher duty cycle, and additional features, such as a higher power radio, a high frequency poll rate, a high visibility display, etc. For example, an entry gate may be hardwired with a battery backup to enable an illuminated display, control of a gate arm, etc.

Area access controls 412 may control an area containing, or being applicable to, zero, one, or many units. For example, an access control at an entry gate may be applicable to all units. Thus, all units codes may also provide gate access. A plurality of keys (e.g., keycards, keypad codes, authentication tokens, mechanical keys, etc.) may operate the gate. In some embodiments, various users may have different access control times. For example one set of users such as maintenance staff or premium customers may have twenty-four hour access while other users such as office staff or certain customers may have a more limited schedule. In some embodiments, the processor 310 can limit access of a user according to their unit status. For example, if a unit rental fee is more than thirty days delinquent, a user may have no access, or access only during certain hours, such as when an office is open. Alternatively, in some embodiments, (e.g., when a payment kiosk is available inside of an area controlled by the access gate), a delinquent user may have access to a gate (e.g., but may not have access to a unit access lock). The processor 310 can receive an indication to limit access from the various communicatively coupled devices described herein.

Area access control 412 may also be limited to a subset of units. For example, a processor 310 can cause an area access control 412 to limit access to users associated with a particular building, a particular floor of a building, etc. For example, an elevator may allow access to a limited subset of floors, or a stairwell lock may determine access according to a user being associated with a storage unit of the relevant floor. Further, access may be controlled by a type of unit, or a parameter associated with a unit. For example, access to a large overhead door may be restricted to storage units suitable for automobile storage, while access to a dock may be limited to units associated (e.g., by an selectable parameter) with boat storage, etc.

Some area access controls 412 may not control access to any storage units. For example, a unit office, janitorial area, etc. may not be associated with any storage unit. However, such access controls may be controlled by similar mechanisms, and stored by the same server, displayed on the same user interfaces, etc. Advantageously, this may simplify access controls to areas of a facility containing storage units and other restricted spaces. The unit access locks 410 or area access controls 412 can be instantiated, executed, or accessible to the processor 310, or another controller in network communication therewith such that one or more processors 310 can lock or unlock lock assemblies in accordance with the unit access locks 410 or area access controls 412.

Figure 5:
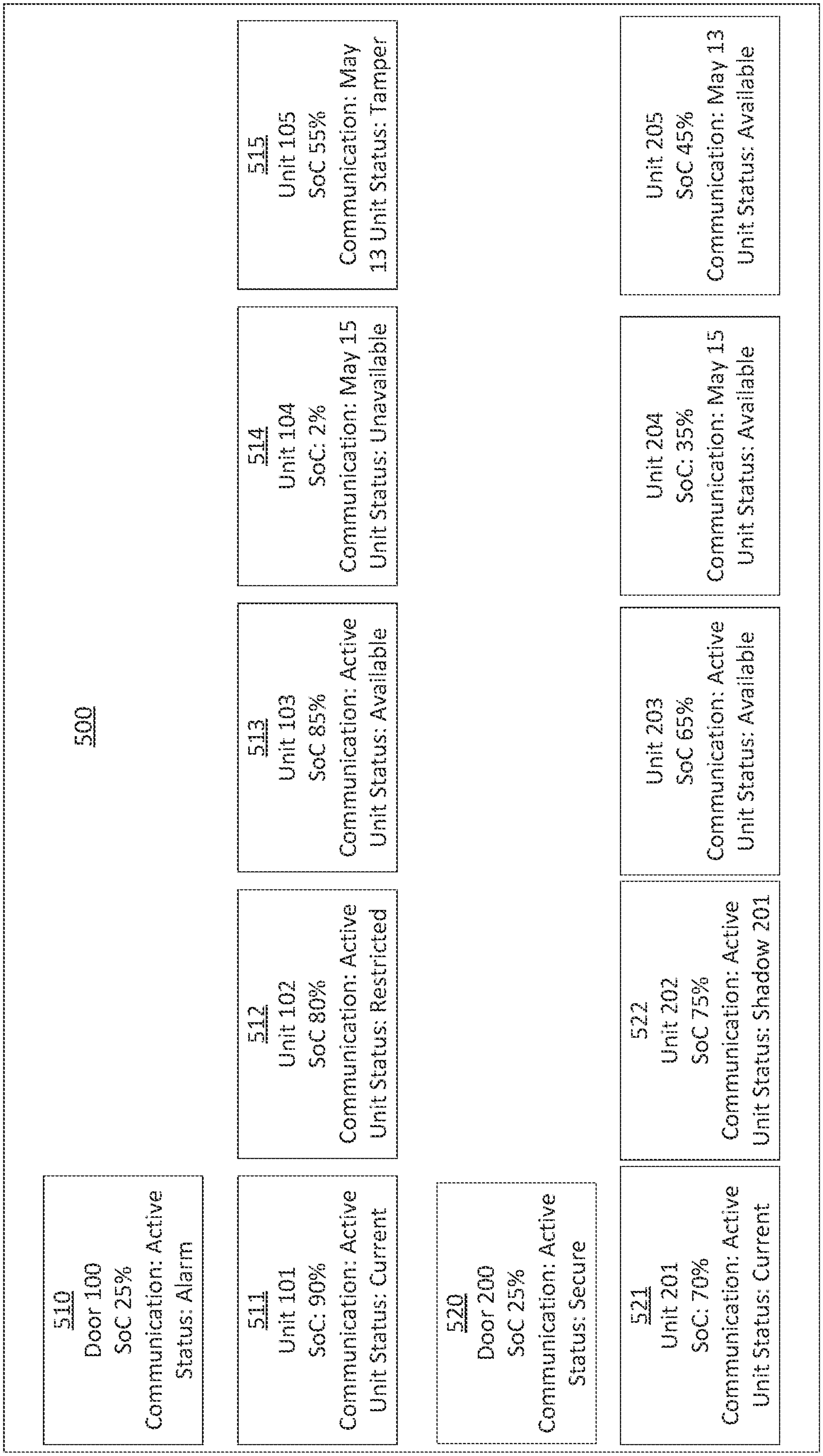
FIG. 5 is a user interface, according to some embodiments of the present disclosure.

FIG. 5 depicts an example GUI displaying the state of various areas and units. A first area access control 510 is shown having a battery SoC and an active communication state, which may be based on a last poll (e.g., in the last hour, the last day, etc.). Further, an alarm state is displayed which may indicate that a door has remained open beyond an expected time (e.g., has been propped open), that a tamper event has been detected, or another condition that requires attention. The various statuses can be determined, by the systems herein by comparison of a time to a predefined threshold. Additional or fewer data may be reported. For example, a status may indicate the state of an associated lock, the status of a hardwired connection, etc. The first unit access control 510 may control access to various units, such as the units on a first floor. The first unit 511 indicates normal operation having an adequate SoC, and active communication. The next unit 512 indicates a restricted unit status which may be indicative of an needed repair or inspection associated with the unit (e.g., a roof leak). The next unit 513 indicates that the unit is available for assignment. Yet another unit 514 indicates a last communication date of May 15, which may be because of insufficient battery charge to maintain communication. Another unit 515 of the first floor indicates a tamper alarm, and shows the unit has not been in communication since May 13$^{th}$, despite apparently adequate battery charge.

A second floor is controlled by a second area access control 520. The first unit 521 indicates that an associated account is current, while an adjacent unit 522 is displayed as shadowed to the first unit. The first 521 and second 522 units may be combined into a single, larger unit.

Figure 6:
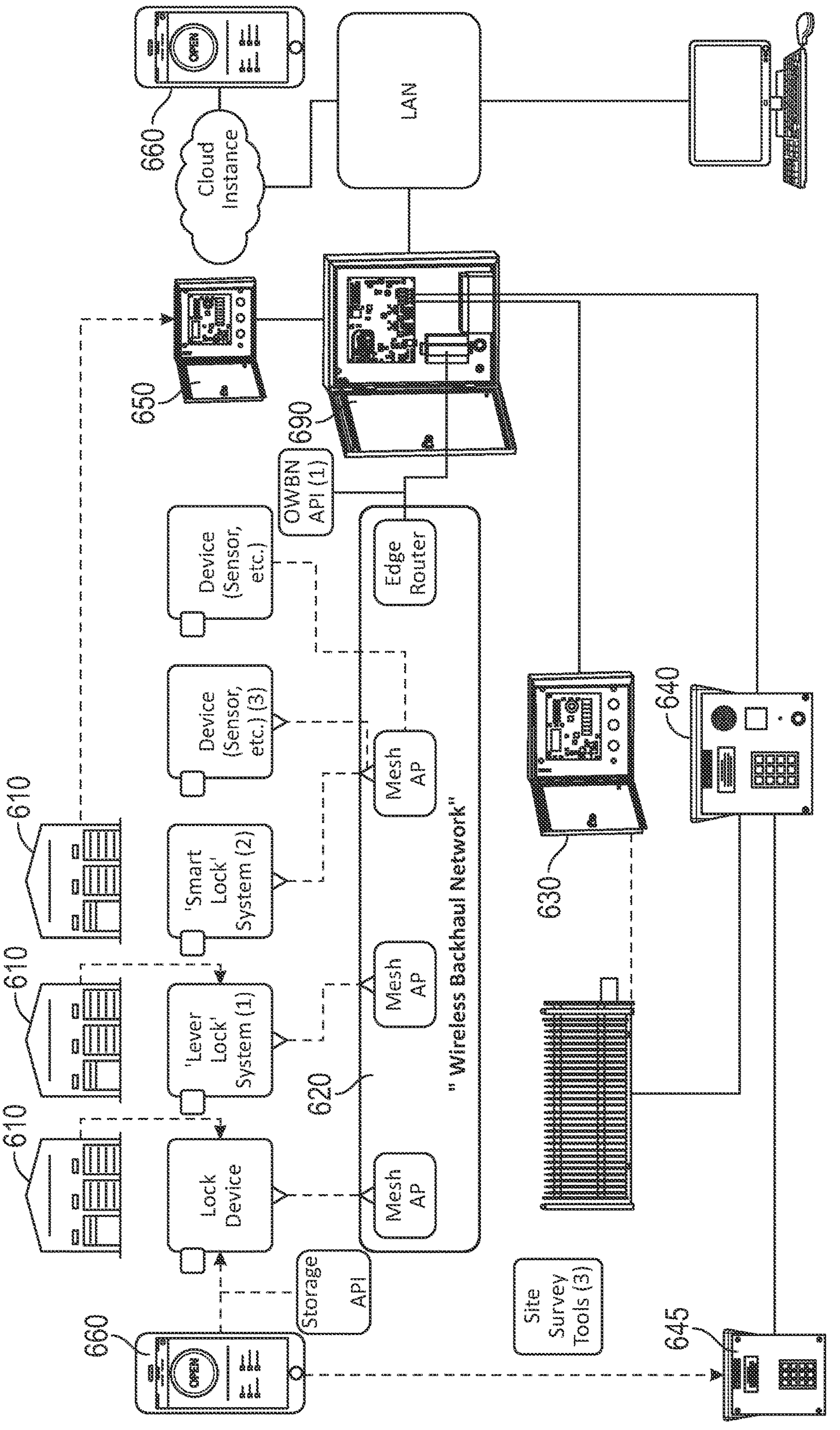
FIG. 6 is a system level diagram of a unit security system, according to some embodiments of the present disclosure.

FIG. 6 depicts an illustrative system of interconnected access control features. A plurality of connected tenant units 610 may comprise one or more lock assemblies. (e.g., one lock assembly per door). The plurality of lock assemblies connect to one or more wireless access points 620 (e.g., through a hierarchical or mesh network), which may also connect to additional wireless access points 620. Wireless access point 620 connections may be over the same network or a different network, and may make use of the same, or a different protocol. For example, all wireless access points 620 and lock assemblies may comprise a single mesh network, or a plurality of sub-networks of lock assemblies may communicate over a first network (e.g., a low power, low-bandwidth network), and the wireless access points may communicate over a second network (e.g., a high power, high bandwidth network). The wireless access points 620 are depicted as connected to a gateway 690 which is, in turn, connected to yet another network. (e.g., the internet or a local access network which may comprise internet connected devices such as firewalls, servers, etc.).

A relay 630 is also connected to the gateway 690 which may enable legacy or unsupported devices to be connected over various networks. The relay is depicted as connected to an external gate. One skilled in the art will understand that relays may power various access control devices, as well as other items such as lights, climate control devices, etc. Thus, the inclusion of a relay may enable the connection of various devices without requiring customized support, software, etc. The relay may enable the operation of third party or other devices (e.g., the operation of a gate) and/or may report information as to the status of a device (e.g., door alarms, light states, etc.).

A first keypad device 640 is also connected to the gateway 690. In some embodiments, the keypad may act as an input device, and entered key codes may be verified by the gateway or another network connected device (e.g., a server). In some embodiments, at least a portion of key codes may be stored locally, and key codes may be updated over the gateway connection (e.g., an expiration of a key code may be adjusted, an authorization of a key code may be revoked, etc.). Advantageously, this may allow the operation of the device during network failure, and access by a non-internet connected mobile device (e.g., over Bluetooth), while retaining the ability to update access over a network. In addition to or instead of key code management, the gateway device 690 may perform other tasks. For example, the gateway may stream audio or video files. For example, the gateway may be connected to a microphone (e.g., a microphone of the first keypad device) to stream audio between a customer and a remote support center (not depicted). Some embodiments may also comprise video streams, such as a video stream captured by a camera of the first keypad device 640, or another camera (e.g., a security camera).

A second keypad device 645 is connected to the gateway 690, through the first keypad device 640. The second keypad device is also connected to a Bluetooth low-energy (BLE) network. The BLE connection may interface with a mobile device 660 such as a laptop computer or mobile telephone in order to allow access to the gate. The mobile device 660 may also connect to the various lock assemblies over a BLE connection. The mobile device 660 may pass an authentication credential directly (i.e., without passing through an intermediate network device) to one or more of the lock assemblies over this connection. In some embodiments, this connection may be independent of the gateway 690 (e.g., authorization codes may be stored locally on the lock assemblies, reducing infrastructure needs for operation, such as network reliability). In some embodiments, additional or alternate methods of passing authorization credentials to lock assemblies may be present. For example, an authorization credential may be provided to a lock assembly by NFC, RFID, a keypad, etc.

An alarm panel 650 is also shown connected to the gateway. The alarm panel 650 may provide additional or redundant information. For example, the alarm panel 650 may provide an alarm that is not provided to the wireless access point 620 to the gateway 690, or may provide an existing alarm directly to the gateway 690, in order to bypass the wireless access point 620, edge routers, etc. The various data passed to the gateway 690 may be stored in a database (e.g., a local database on a local access network connected to the gateway 690, or on the internet, such as on a cloud database). The mobile device 660 may connect to various information via another network (e.g., the internet).

Figure 7:
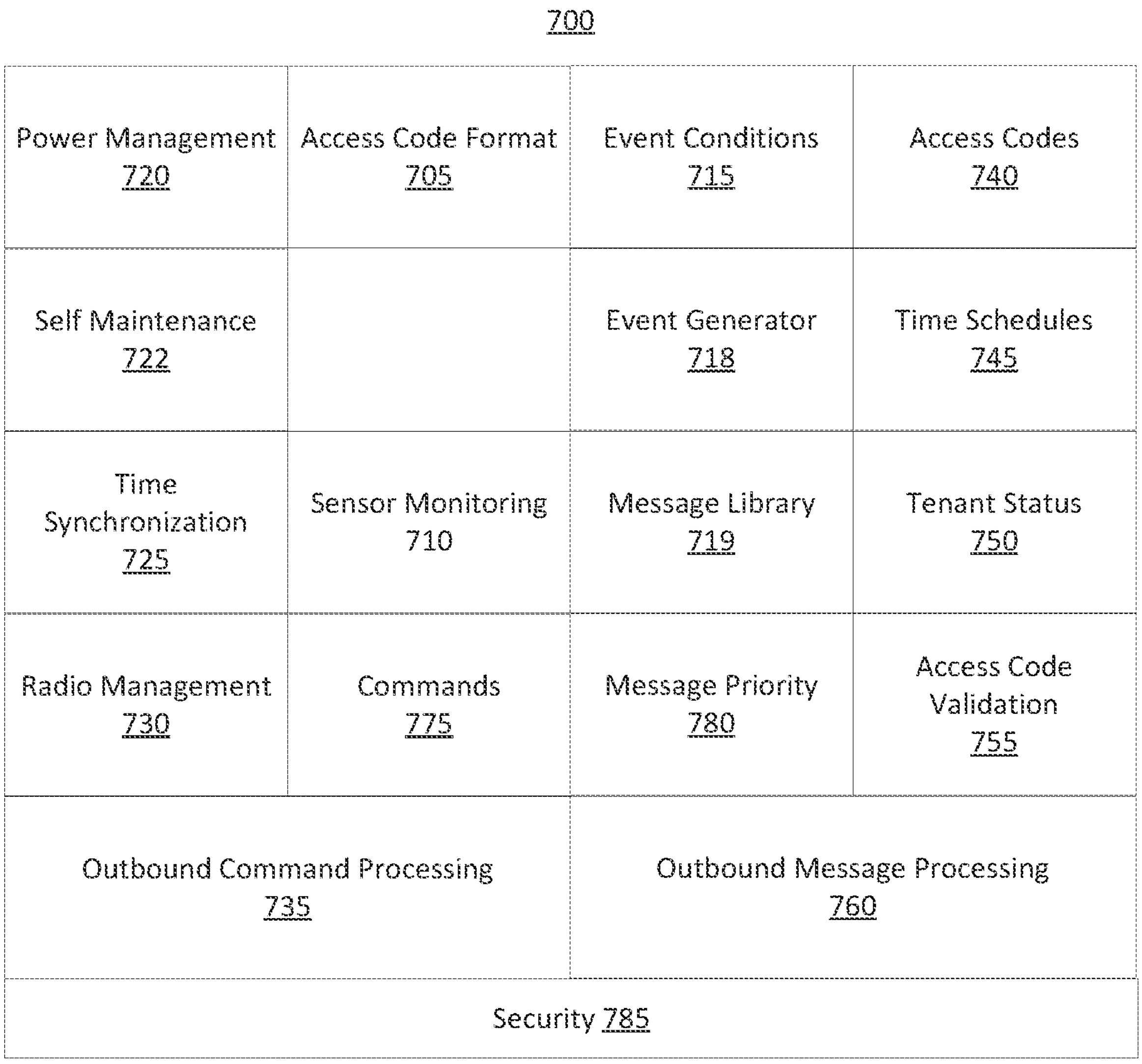
FIG. 7 is a component based block architecture of logical elements of a electronically controlled lock assembly, according to some embodiments of the present disclosure.

FIG. 7 depicts various software components 700 of a lock assembly. The various components may be stored on a non-transitive memory and may be configured to be executed by a processor (e.g., the processor 310 of FIG. 3). An access code format component 705 may be configurable to receive access codes of varying format. Optionally, an access code may be entered with one or more preceding indicating characters (e.g., a #or a *, but in some cases any other character) which may be received prior to recording a code, which may then be accepted (e.g., as a sequence of characters, a string, etc.). Similarly, a trailing character may be used (e.g., to indicate the completion of the entry of a code). In some embodiments, a code length may be fixed, and thus a trailing character may not be required. For example, a code entry may be "#123456" where the # is a preceding character, and the portion of the code following the  may be known to be three digits, thus the entry may be accepted upon the entry of the "6."

Sensor monitoring component 710 may monitor various sensors regarding the state of the lock (e.g., hasp position, battery state, etc.) and may take action upon certain conditions. For example, upon reaching a pre-established battery SoC, the sensor monitoring component 710 may generate or cause to be generated, a message indicating the SoC. The sensor monitoring component 710 may operate with fixed pre-defined thresholds or include selectable thresholds, which may be updated or selected in response to detected patterns, a manual update, etc. At 715, an event condition component 715 (e.g., an event handler) may respond to selections of various thresholds by defining triggers. The event condition component 715 may also archive various event codes according to a defined formats (e.g., may maintain a circular buffer of events such as updates, locks, unlocks, etc. which may be provided to a database over a network). For example, the event condition component 715 may cause the system to enter a wake state upon a keypad entry. A power management component 720 may monitor and control battery and other operations. For example, the power management component 720 may evaluate battery health and adjust system operation of parameters based on SoC. In response to a low battery, the power management component 720 may cause a polling frequency to drop, an LED indication to be displayed, etc.

An event generator component 718 may generate and cause a message to be sent in response to a threshold or other trigger being met (e.g., externally over a network, to another logical component, to a human interface device such as a speaker or an LED). For example, if a low SoC is reached, a lock is manipulated, etc., the event generator component 718 may compose a message comprising the event as well as ancillary data such as a state, a time, a message ID, or sensor data in a raw or processed form. The message may be caused to be delivered, such as by storing the message in an outbound queue. Further, the message may be selected from a message library component 719 which may maintain a variety of message types, formats, etc. Advantageously, such formats may minimize the size of data transmissions by standardizing data sets and message formats. Various messages may be stored, including messages relating to lock status (e.g., sensor data), maintenance data, firmware versions, lock settings, etc. The message library component 719 may also enable the identification of high priority messages (i.e., alert messages) by a message priority component 780. High priority messages may be prioritized for transmission by an originating device, or other devices comprising a network. A prioritized message may result in substantially faster propagation in a low bandwidth mesh network. Some messages may be stored to await a periodic transmission, some messages may cause an activation of a radio for their immediate transmission. High priority messages may include door alarms (e.g., based on door tilt sensors) wherein a door is indicated to be opened or otherwise moved without authorization, one or more invalid access codes entered within a time limit, battery tampering, a temperature exceeding a threshold, a lock which has remained unlocked in excess of an established threshold, etc.

A self-maintenance component 722 controls various functions to ensure various hardware and software operation. For example, the maintenance component may manage (e.g., update, roll back, etc.) any firmware, manage buffers, and control operation of various mechanical components to prevent seizure, such as following a long period of non-use. For example, the self-maintenance component 722 may engage an actuator to prevent corrosion from seizing a latching mechanism shut. The actuator may be operated along a full or a partial range of motion, and thus may or may not result in a lock state change (e.g., a momentarily unlocking).

A time synchronization component 725 may harmonize a system time or real time clock with an external time such as a server time. Such a system may ensure that sent or received messages are appropriately encoded, date stamped, that an authorization code with an expiration date is properly handled, etc. The time synchronization component 725 may also manage various periodic routines of any other component. For example, if the self-maintenance component 722 engages an actuator every 2500 hours, and checks for firmware updates on the first day of every month, the time synchronization component may maintain timers, which may be accessed by another component (e.g., in response to an event generated by the time synchronization component 725).

A radio management component 730 may manage the state of various radios. For example, the radio management component 730 may alter radio state or power in response to the operations of the power management component 720 or the event condition component 715. The radio management component 730 may interface with inbound message processing 735, and outbound message processing 760. For example, the radio management component 730 may activate or deactivate radios in response to messages in an outbound queue based on their content, priority, a designated transmission window, etc. The outbound messaging processing 760 component may also ensure receipt of messages and/or handle retransmission based on acknowledgement or non-acknowledgement messages, as may be present in a buffer of incoming messages. The radio management component 730 may also manage various network attributes, such as connection attributes for a mesh or hierarchical network (e.g., discoverability, proximity, hop counts, etc.). Inbound message processing 735 may cause the execution of any inbound instructions, either by executing the commands, or by passing the commands to another portion. For example, inbound message processing 735 may add or remove visitor access codes, time schedules, perform lock maintenance, force the lock into a locked state, etc.

A commands component 775 may enable or disable commands which are received by the lock assembly. For example, a command to force a lock open, or add an access code to the lock by remote update (e.g., over a particular network, a temporary code, by a user classification, etc.) may be disabled according to a local policy. In some embodiments, certain commands may only be authorized locally. For example, clearing an event buffer may be allowed over a debug port, but disallowed over a network or keypad. The commands component 775 may also monitor various states, which may enable/prevent certain commands. For example, in a factory state, the unique identifier may be assigned, whereas in an operational state, the unique identifier may be fixed. Further, in a logical overlock state, the lock may not allow any access until it is released from the logical overlock state (e.g., by a message over a network).

An access code component 740 maintains various access codes. Some access codes may have associated time schedules, as managed by the time schedule component 745. For example, an access code may only operate during business hours, or may not operate during designated events such as holidays. Further, the access rights of various access codes may depend on a tenant status (e.g., account status), as managed by a tenant status component 750 (e.g., via periodic updates over a radio). The access code may validate access codes through a access code validation component 755, which may comprise comparing plain-text codes, encrypted codes, salted and/or hashed codes, etc.

A Security component 785 manages various aspects of the lock assembly. For example, various tamper detection features may be monitored by the security component 785. The security component 785 may also encrypt data stored on the device (e.g., data stored in transitive or non-transitive memory). The security component 785 may take action in regards to correct or incorrect code entries in sequence or within a time period. For example, the security component 785 may lock the touchpad and cause a message to be generated indicating an incorrect entry, or may generate a message in response to a correct entry to alert a user (e.g., on a mobile device). The security component 785 may also encrypt some or all messages, and/or manage the encryption, decryption, salting, hashing etc. of various authentication token keys.

As one skilled in the art will understand, various component disclosed herein represent a non-limiting illustrative example of the organization of a logical control system. Functionality may be distributed in any manner within a device, or between devices. Indeed, many components may generate instances of other components as a part of their operation. In some cases, contention between various components may be managed (e.g., by voting, hierarchy, etc.). For example, if a tamper alarm is indicated during a low power event, the message priority component 780 may disregard an indication from the power management component 720 that radios should remain unpowered. The security component 785 may also maintain various passwords which may be global, or specific to a port (e.g., to a UART, a network, a keypad, etc.).

Figure 8A:
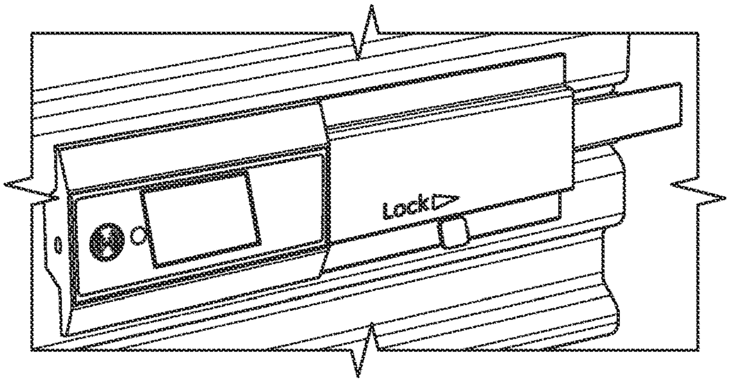
FIGS. 8A, 8B, 8C, and 8D are various lock assemblies, according to some embodiments of the present disclosure.
Figure 8B:
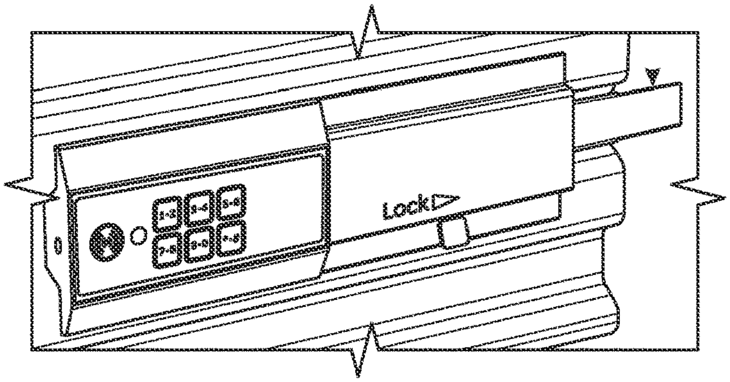
Figure 8C:
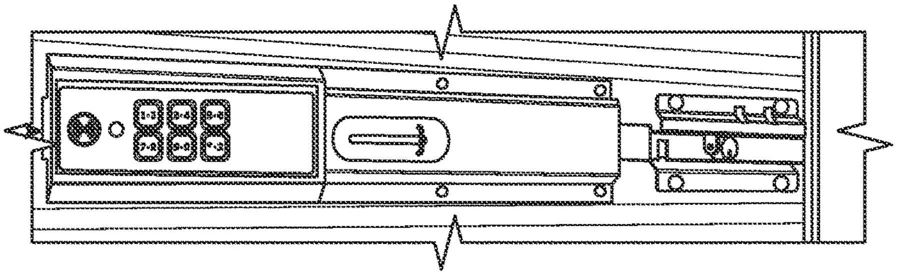
Figure 8D:
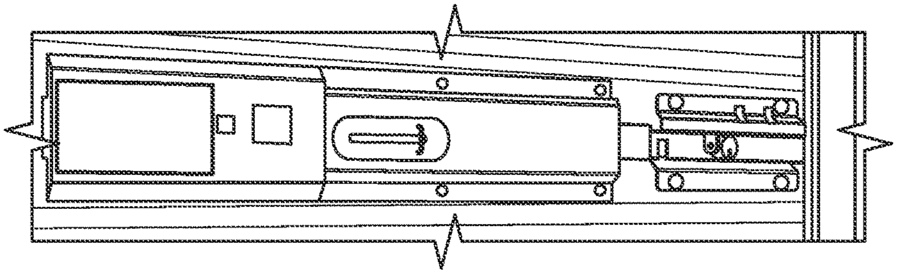

FIG. 8A depicts a lock assembly 100 configured to mate a hasp tongue with a mortise. FIG. 8B depicts another embodiment of a lock assembly 100, having a keypad 142. FIG. 8C depicts yet another lock assembly 100, which is configured to mate with another mortise, which may be a legacy lock mechanism, and may be configured to receive a mechanical lock (not pictured) to arrest the movement of a hasp or otherwise lock the door. FIG. 8D depicts an additional lock assembly 100, which is configured to mate with a legacy lock mechanism. Various embodiments may be configured to interface with doors with various mechanical attributes. For example, a roller door and a hinged door may be used with the lock assembly 100, which may comprise different tilt-sensor thresholds to determine the state of the door.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents. Changes and modifications to the described embodiments can be made in accordance with ordinary skill in the art without departing from the technology in its broader aspects as defined in the following claims.

What is claimed is:

1. A locking mechanism comprising:

a slidable member comprising a captive latch pin protruding from the slidable member;

a captive latch and an actuator configured to manipulate the captive latch, the captive latch comprising a spring element that closes the captive latch and selectively locks the captive latch pin of the slidable member in retention by the captive latch without involvement of the actuator, wherein the captive latch is configured to receive the captive latch pin wherein the slidable member may slidably move when the captive latch pin is not retained by the captive latch, and wherein a retention of the captive latch pin by the captive latch arrests the slidable movement of the slidable member.

2. The locking mechanism of claim 1, wherein the captive latch pin protrudes in a perpendicular direction to a direction of the slidable movement.

3. The locking mechanism of claim 1, wherein a first end of the slidable member comprising a tongue and a opposite second end of the slidable member comprising the captive latch pin are coupled.

4. The locking mechanism of claim 1, wherein the actuator is communicatively coupled to a processor which is communicatively coupled to a keypad, and wherein the processor is configured to engage the actuator upon (1) receiving a lock assembly command received via the keypad and (2) comparing said lock assembly command to a code stored in a local memory.

5. The locking mechanism of claim 4, wherein the lock assembly command is authenticated based on a comparison to data.

6. The locking mechanism of claim 4, wherein the lock assembly command is authenticated based on a comparison of a current date to an expiration date.

7. The locking mechanism of claim 4, wherein the lock assembly command is authenticated based on a comparison to data stored locally on the locking mechanism.

8. The locking mechanism of claim 1, wherein the actuator is communicatively coupled to a processor which is communicatively coupled to a network device, and wherein the processor is configured to engage the actuator upon receiving a lock assembly command over a network upon comparing said lock assembly command to a code stored in a local memory.

9. A locking mechanism comprising:

a captive latch pin protruding from a slidable member, wherein the slidable member comprises a tongue coupled to the captive latch pin, wherein the tongue comprises a first portion that is coupled to a second portion that comprises the captive latch pin, wherein the first portion and the second portion are selectively slidable such that a longitudinal dimension of a combination of the first portion and the second portion is variable;

an actuator assembly including a captive latch and an actuator configured to manipulate the captive latch between a first orientation configured to selectively retain the captive latch pin and a second orientation configured not to selectively retain the captive latch pin; and a lock body obstructing access to at least a portion of the slidable member and the actuator assembly.

10. The mechanism of claim 9, wherein the slidable member comprises a protrusion in a perpendicular direction to a direction between the first orientation and the second orientation.

11. The mechanism of claim 9, wherein the tongue is at an opposite end of the slidable member relative to the captive latch pin of the slidable member.

12. The mechanism of claim 9, further comprising:

a processor connected to the actuator and selectively operating the actuator to manipulate the captive latch between the first orientation and the second orientation in response to a lock assembly command, wherein the processor is also connected to a network via a network device to receive the lock assembly command over the network.

* * * * *